United States Patent [19]
Bornhorst, Jr. et al.

[11] Patent Number: 5,751,435
[45] Date of Patent: *May 12, 1998

[54] METHOD AND APPARATUS FOR ALIGNING A CYLINDER IN AN ENGRAVER

[75] Inventors: Kenneth F. Bornhorst, Jr., Centerville; Robert Dean Likins, Wilmington; Thomas J. Eichhorn, Dayton; David R. Seitz, Vandalia; Curtis Woods, Centerville, all of Ohio

[73] Assignee: Ohio Electronic Engravers, Inc., Dayton, Ohio

[ * ] Notice: The term of this patent shall not extend beyond the expiration date of Pat. No. 5,424,846.

[21] Appl. No.: 480,919

[22] Filed: Jun. 7, 1995

Related U.S. Application Data

[63] Continuation of Ser. No. 057,327, May 7, 1993, Pat. No. 5,424,846.

[51] Int. Cl.$^6$ .................................................. B41C 1/02
[52] U.S. Cl. .................................................. 358/299
[58] Field of Search .................................................. 358/299

[56] References Cited

U.S. PATENT DOCUMENTS

| | | | |
|---|---|---|---|
| 1,815,105 | 7/1931 | Howey . | |
| 2,493,628 | 1/1950 | Harley | 88/14 |
| 2,769,199 | 11/1956 | Boyajean | 18/1 |
| 2,874,479 | 2/1959 | Farber | 33/185 |
| 2,881,246 | 4/1959 | Fairchild | 178/6.6 |
| 3,544,713 | 12/1970 | Case et al. | 178/7.1 |
| 3,582,549 | 6/1971 | Hell et al. | 178/69.5 F |
| 3,694,570 | 9/1972 | Kotov et al. | 178/6.6 B |
| 3,770,888 | 11/1973 | Devos et al. | 178/6.6 B |
| 3,838,258 | 9/1974 | Logan | 235/151.11 |
| 3,949,159 | 4/1976 | Ricards et al. | 178/6.6 B |
| 3,964,382 | 6/1976 | Baar et al. | 101/1 |
| 3,990,133 | 11/1976 | Schalles et al. | 29/27 C |
| 4,003,311 | 1/1977 | Bardin | 101/426 |
| 4,013,829 | 3/1977 | Baar et al. | 358/299 |
| 4,054,081 | 10/1977 | Brown | 90/11 C |
| 4,054,745 | 10/1977 | Norman | 178/4.1 R |
| 4,057,838 | 11/1977 | Doelves et al. | 358/299 |
| 4,357,633 | 11/1982 | Buechler | 358/299 |
| 4,450,486 | 5/1984 | Buechler | 358/299 |
| 4,451,856 | 5/1984 | Buechler | 358/299 |
| 4,605,320 | 8/1986 | Glossner | 384/494 |
| 4,612,584 | 9/1986 | George et al. | 358/299 |
| 5,029,011 | 7/1991 | Fraser | 358/299 |
| 5,424,846 | 6/1995 | Bornhorst, Jr. et al. | 358/299 |
| 5,492,057 | 2/1996 | Bornhorst, Jr. et al. | 358/299 X |
| 5,583,647 | 12/1996 | Izor et al. | 358/299 |

OTHER PUBLICATIONS

Boppel, Wolfgang, "High Speed Electron Beam Engraving Method or Procedure for Engraving of Metal Cylinders", *Optic* 77, No. 2, Scientific Publication Company mbH, Stuttgart, Apr. 13, 1987.

(List continued on next page.)

*Primary Examiner*—Eric Frahm
*Attorney, Agent, or Firm*—Jacox, Mackstroth & Jenkins

[57] ABSTRACT

A method and apparatus for automated loading and unloading of a cylinder in an engraver. The method and apparatus permit the engraver to accommodate cylinders of differing geometries, including a range of lengths, diameters and mounting configurations. The engraver includes a headstock and a tailstock which cooperate to rotatably support a cylinder at an engraving station in the engraver. The engraver includes a cylinder handling system having at least one cylinder supporting the cylinder between the headstock and the tailstock during the loading and unloading of the cylinder. The cylinder handling system includes a driver for driving the cylinder support towards and away from the engraving station until the headstock and the tailstock engage and rotatably support the cylinder. Once the cylinder is rotatably supported between the headstock and the tailstock, then the cylinder support is retracted. The cylinder support includes a telescoping support member having a support nest for engaging and supporting the cylinder at the engraving station.

35 Claims, 6 Drawing Sheets

OTHER PUBLICATIONS

"Electron Beam Engraving from Hell for Manufacturing Gravure Cylinders", by Wolfgang Boppel, Dr.–Ing. Rudolph Hell GmbH, Postfach 60 29, D–2300 Kiel 14, undated article "Motion Adapted to Human Needs," Magnetic Antriebstechnik.

"Linear Actuator P Series . . . ."Infomagnetic Antriebstechnik.

"Magpush Linear Actuators. Push–pull solutions that stand out.", Magnetic Antriebstechnik.

"Telescope Actuators Telemag GTL . . . ", Infomagnetic Antriebstechnik.

"Telescope Actuators Telemag LC 12Z . . . ," Infomagnetic Antriebstechnik.

"Telescope Actuators Telemag HC 8A . . . ", Infomagnetic Antriebstechnik.

"The Telemag Pillar. Gives your ideas the right lift.", Magnetic Antriebstechnik.

"telemag–the obvious choice for flexibility and economy at work.", Magnetic Elektromotoren.

"Telemag 2–Section, LC12ZWAK," and Telemag 3–Section, LCWDK, Magnetic Corporation.

"Magnetic Linear Actuators. Right for every application.", Magnetic Antriebstechnik.

"Think Boomerang Systems",undated.

"Martin Galvanotechnik Galvano plastic Plating ", R. Martin AG, undated.

"Datwyler", Max Daetwyler Corporation, 13420 W. Reese Blvd., Huntersville, NC 28078, undated brochure.

"Twin–Pilot", Maschinenfabrik Kasper Walter GmbH & Co. KG, Plinganserstrasse 22,8000 Munchen 70, Germany, undated brochure.

"The Gravure Engraving Manual", The Gravure Association of American, 1987.

"Basic Rotogravure," Ralcom, 1988.

"Drucktechnische Beratung–Graphischer Handel", Heimann GmbH, Hamm, Germany, 1984.

"Check–Master", Heimann GmbH, undated pamphlet.

"Engraving Tester ET 2000", Ahauser Treforuck–Gravuren GmbH & Co., undated pamphlet.

"M2B2 modele depose Micro Surface Scarl", Promatec Graphique, Antony, France, 1987.

"VIP–Video–Image–Processing", author unknown, undated pamphlet.

METHOD AND APPARATUS FOR ALIGNING A CYLINDER IN AN ENGRAVER

RELATED APPLICATION

This application is a continuation of Ser. No. 08/057,327 filed May 7, 1993, now U.S. Pat. No. 5,424,846.

BACKGROUND OF THE INVENTION

1. Field of the Invention

This invention relates to an engraver, and more particularly, it relates to a cylinder support and method for supporting a cylinder to be engraved in an engraver of the general type disclosed, for example, in U.S. Pat. Nos. 2,881,246; 2,874,479; 3,964,382; and 4,013,829.

2. Description of Related Art

The basic principle of electromechanical engraving of a gravure cylinder involves rotating a plated cylinder while actuating an electrically driven tool which cuts or engraves cells or lines into the surface of the plated cylinder. The engraved cylinder is normally used in a web-type gravure printing press for printing paper, plastic or metallic film material. In addition to printing newspapers and magazines, the engraved cylinders may also be used for direct or indirect printing of cloth, applying glue, printing of packaging materials for products, and printing of woodgrain patterns for making a wall panelling, floor coverings and other surface coverings.

In the gravure printing process, the engraved cylinder is flooded with ink, and a doctor blade wipes off excess ink from the surface so that only the engraved cells contain ink which is transferred to the material being printed. To obtain a high quality print, it is necessary that the cells be very accurately placed or located on the cylinder surface, usually within 1 or 2 microns within a desired predetermined location. The depth of the engraved cells must also be accurately controlled since the depth determines the amount of ink transferred which, in turn, determines the shade of gray in a black/white print, for example. In a color print, the amount of ink transferred to the paper or materials is even more critical since multiple colors are typically mixed to produce various shades of all possible colors. A slight variation in the desired amount of ink affects not only the darkness of the color but, more importantly, the production of the desired color hues.

In engraving systems of the past, the cylinders were manually guided or hoisted to an engraving area of the engraver, whereupon it was secured between a stationary headstock and a slidable tailstock. The tailstock forcibly engaged one end of the cylinder and forced the other end of the cylinder into engagement with the headstock. For shafted cylinders, the ends of the cylinders would be gripped by chucks or other clamping devices located in the headstock and tailstock.

Another problem with engravers of the past is that the cylinders had to be manually loaded into the engraver. Because of the weight and size of the cylinders, it was very time-consuming to properly position and manually align the cylinders in the engraver. In addition, it was often necessary that the operator manually adjust the tailstock before the engraver could accommodate cylinders of varying lengths. Still another problem is that in the engravers of the past, the operator had to manually adjust the engraving head to accommodate cylinders of different diameters.

What is needed, therefore, is a method and apparatus for facilitating loading a cylinder in an engraver and for handling the cylinder so that it can be properly centered and aligned between the headstock and tailstock of the engraver.

SUMMARY OF THE INVENTION

In one aspect, this invention comprises a cylinder handling system for use in an engraver having a headstock and a tailstock which cooperate to rotatably support a cylinder at an engraving station in said engraver, comprising at least one support for supporting the cylinder between said headstock and tailstock; and a driver coupled to the at least one support for driving said at least one support towards and away from said engraving station.

In another aspect, the invention comprises a cylinder support for use in an engraver having headstock and tailstock which cooperate to rotatably support a cylinder at an engraving station in said engraver, comprising support means for supporting the cylinder between said headstock and tailstock; and drive means coupled to said support means for driving said support means towards and away from said engraving station.

In another aspect, the invention comprises the method for supporting a cylinder in an engraver comprising the steps of: (a) positioning the cylinder on a support at an engraving station in the engraver; (b) rotatably supporting said cylinder between a headstock and a tailstock; and (c) retracting said support away from said engraving station.

In another aspect, the invention comprises the method for supporting a cylinder in an engraver comprising the steps of: (a) positioning the cylinder on a support at an engraving station in the engraver; (b) rotatably supporting said cylinder between a headstock and a tailstock; (c) retracting said support away from said engraving station; and (d) driving the engraver which permits the head to be driven into operative relationship with the cylinder surface.

An object of this invention is to provide a method for automatically loading a cylinder in an engraver, thereby either reducing or eliminating the need for precision handling by an operator.

Another object of this invention is to provide a cylinder handling system which facilitates the centering of a cylinder between a headstock and a tailstock of an engraver.

Still another object is to provide an engraver which can accept a variety of setup parameters, including cylinder length, diameter, test cut position and engrave head characteristics from a controller, thereby reducing or eliminating the need for manual adjustment by an operator.

Another object of this invention is to provide a cylinder handling system having an automatically controlled headstock, tailstock and head slide which provide for programmable adjustment in order to accommodate cylinders of varying lengths and diameters.

These objects, and others, may be more readily understood in connection with the following specification, claims, and Drawing.

3

Figure 4:
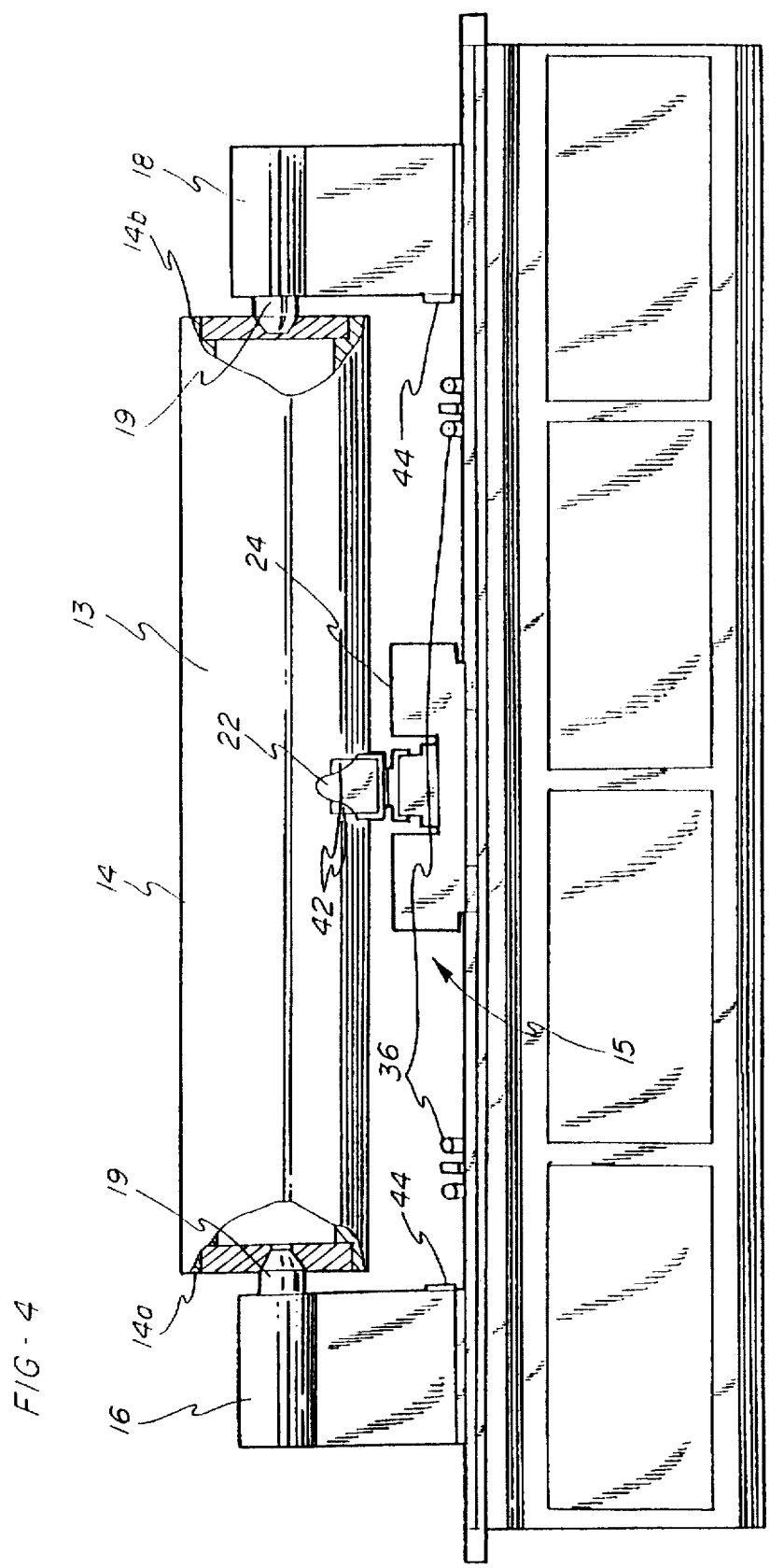
Figure 5:
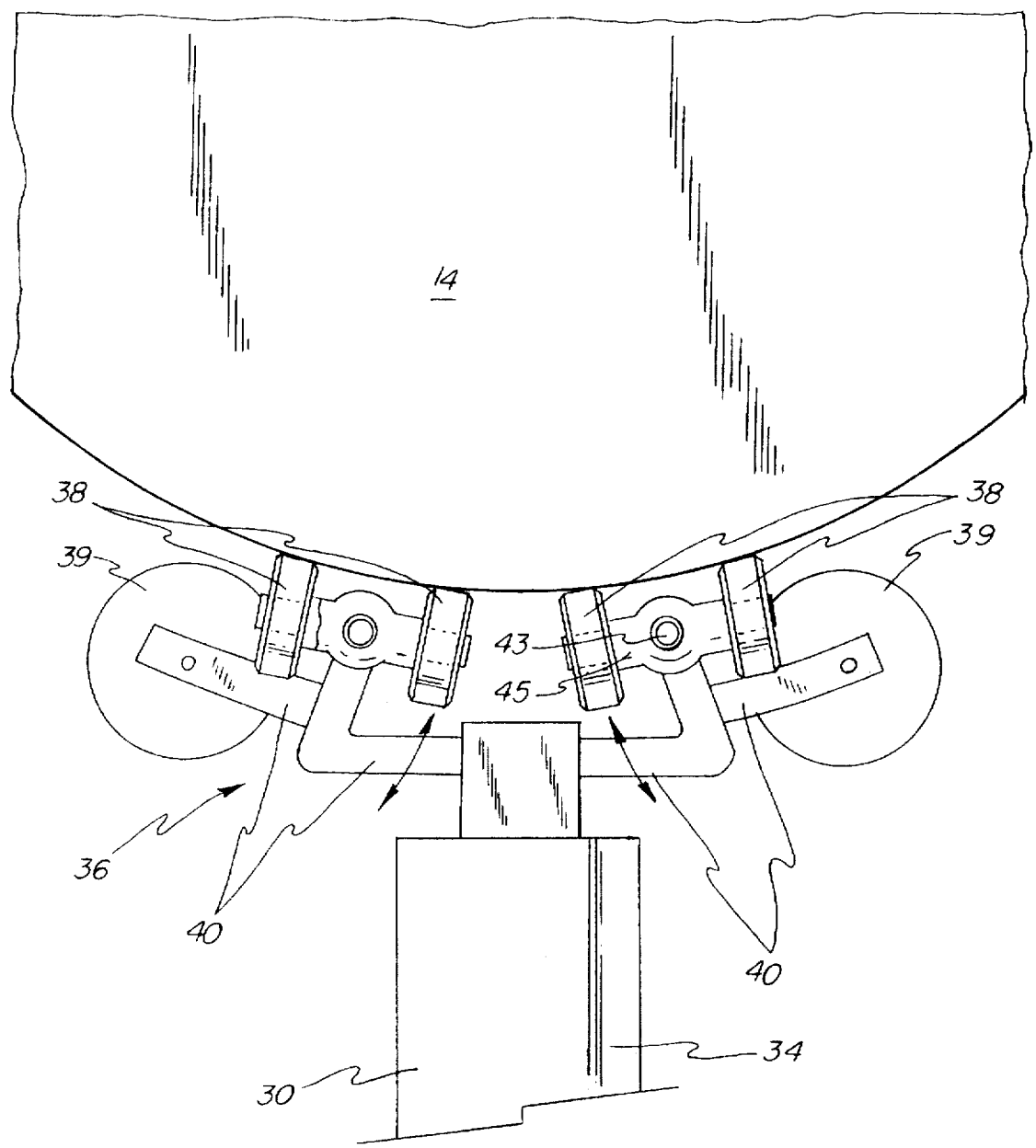
Figure 6:
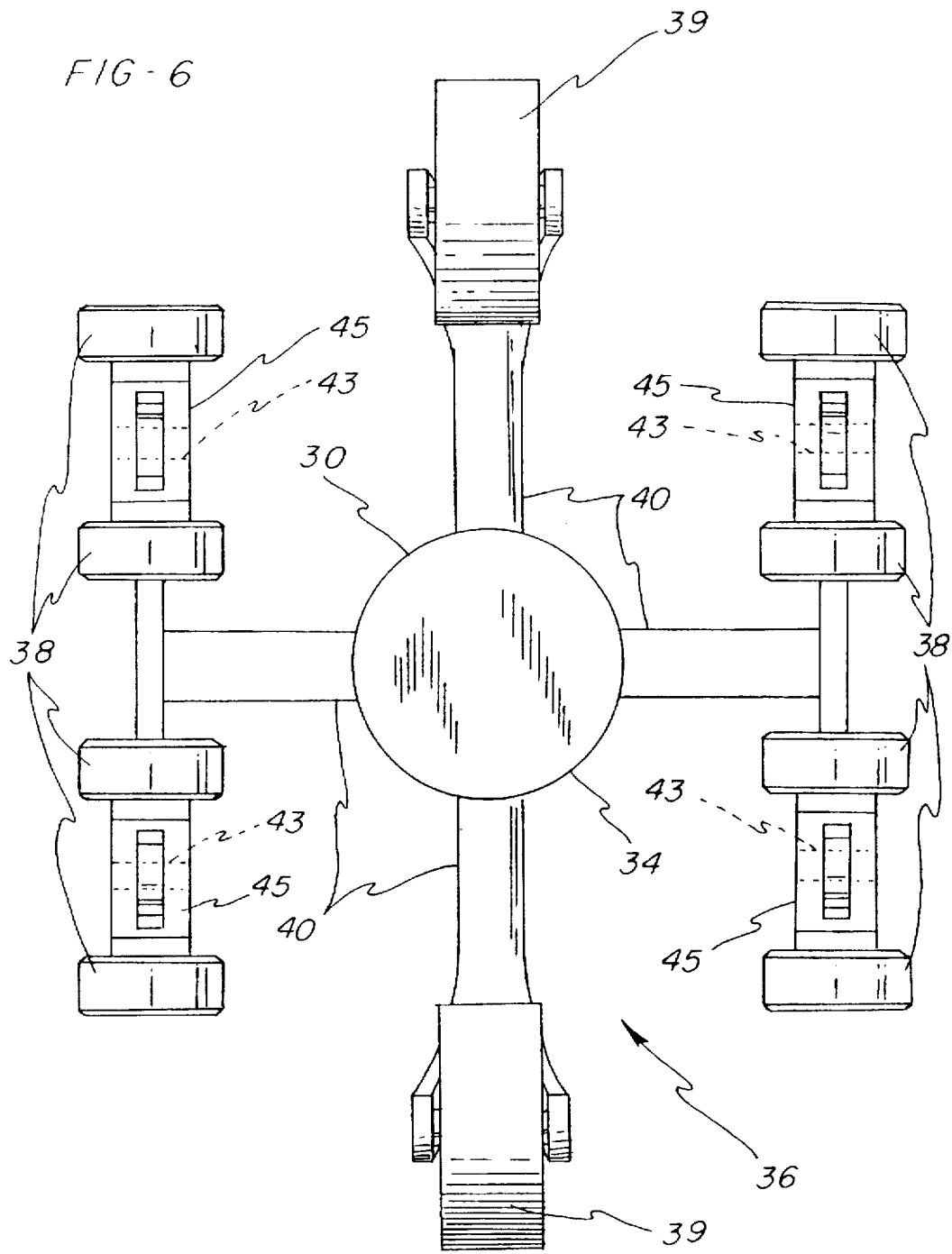

FIG. 4 is another plan view of the engraver showing the cylinder rotatably supported by the headstock and tailstock after the cylinder supports have been retracted;

FIG. 5 is a fragmentary sectional view showing details of the cylinder support and a support nest; and FIG. 6 is a top view of one of the cylinder supports, showing details of the support nest.

DETAILED DESCRIPTION OF THE PREFERRED EMBODIMENTS

Figure 1:
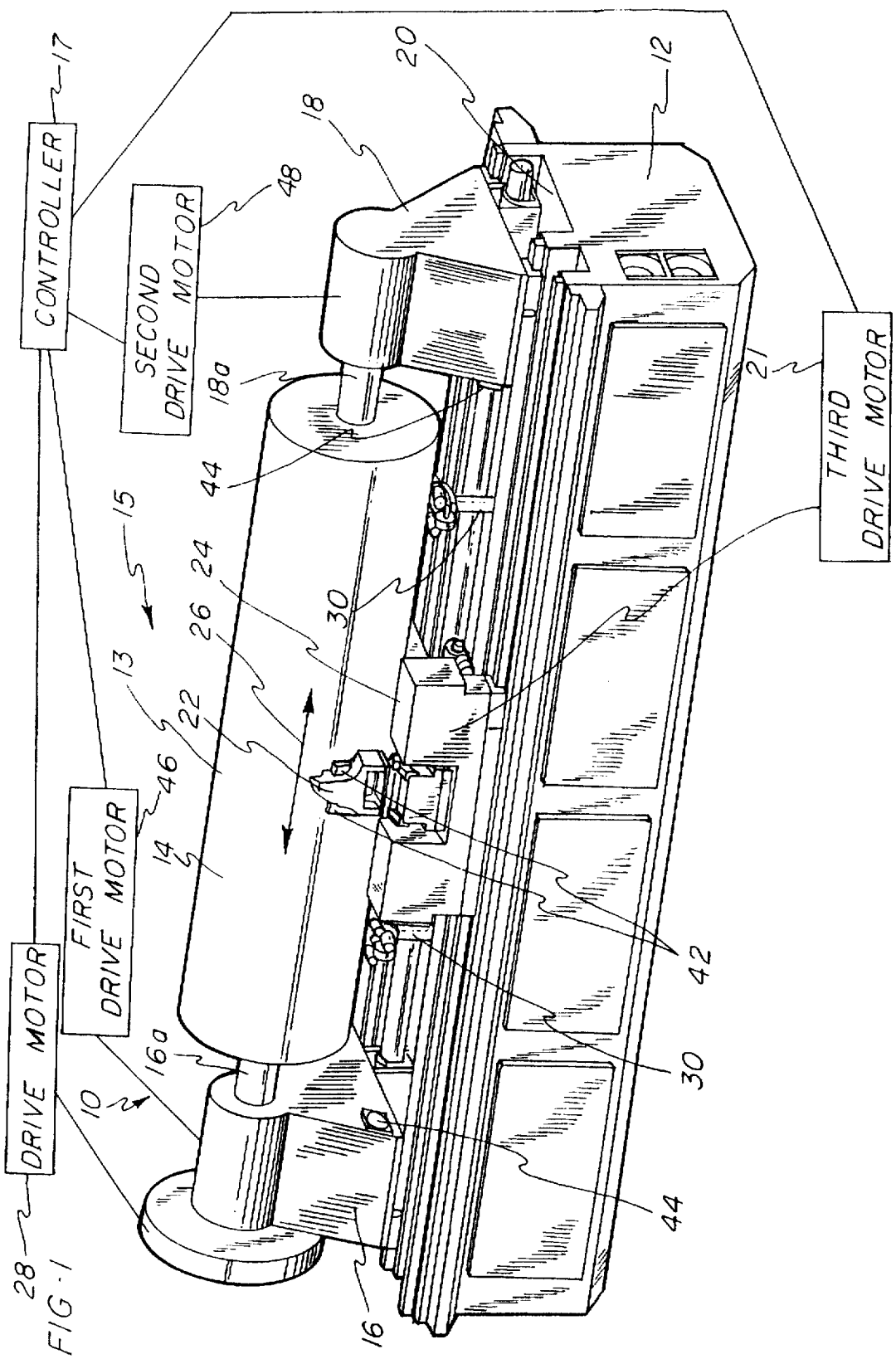
FIG. 1 is perspective view of a programmable gravure engraver showing a headstock, a tailstock, an engraving head, and a plurality of cylinder supports.
Figure 2:
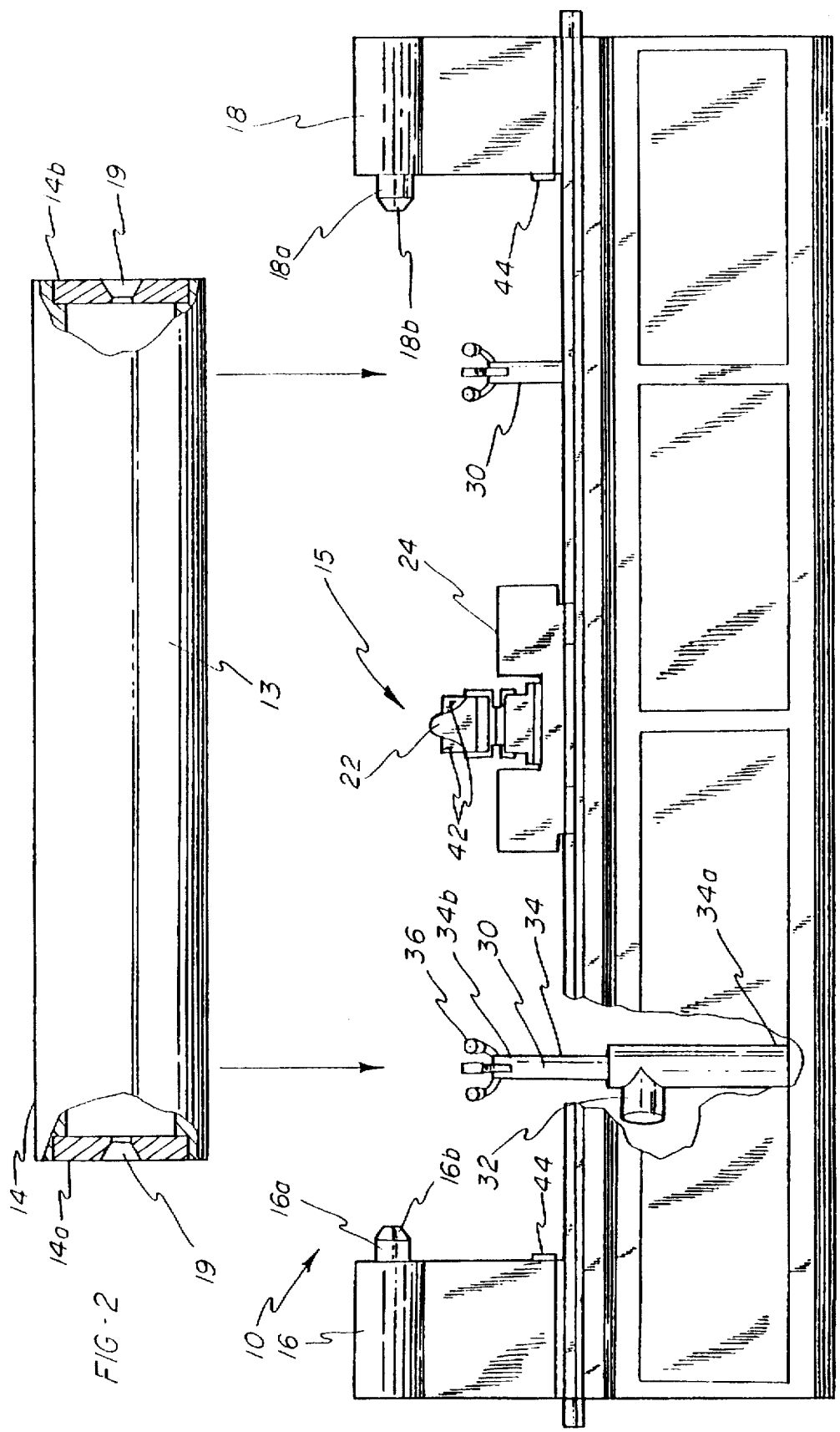
FIG. 2 is a fragmentary front plan view of the engraver shown in FIG. 1, showing details of one of the telescoping cylinder supports.
Figure 3:
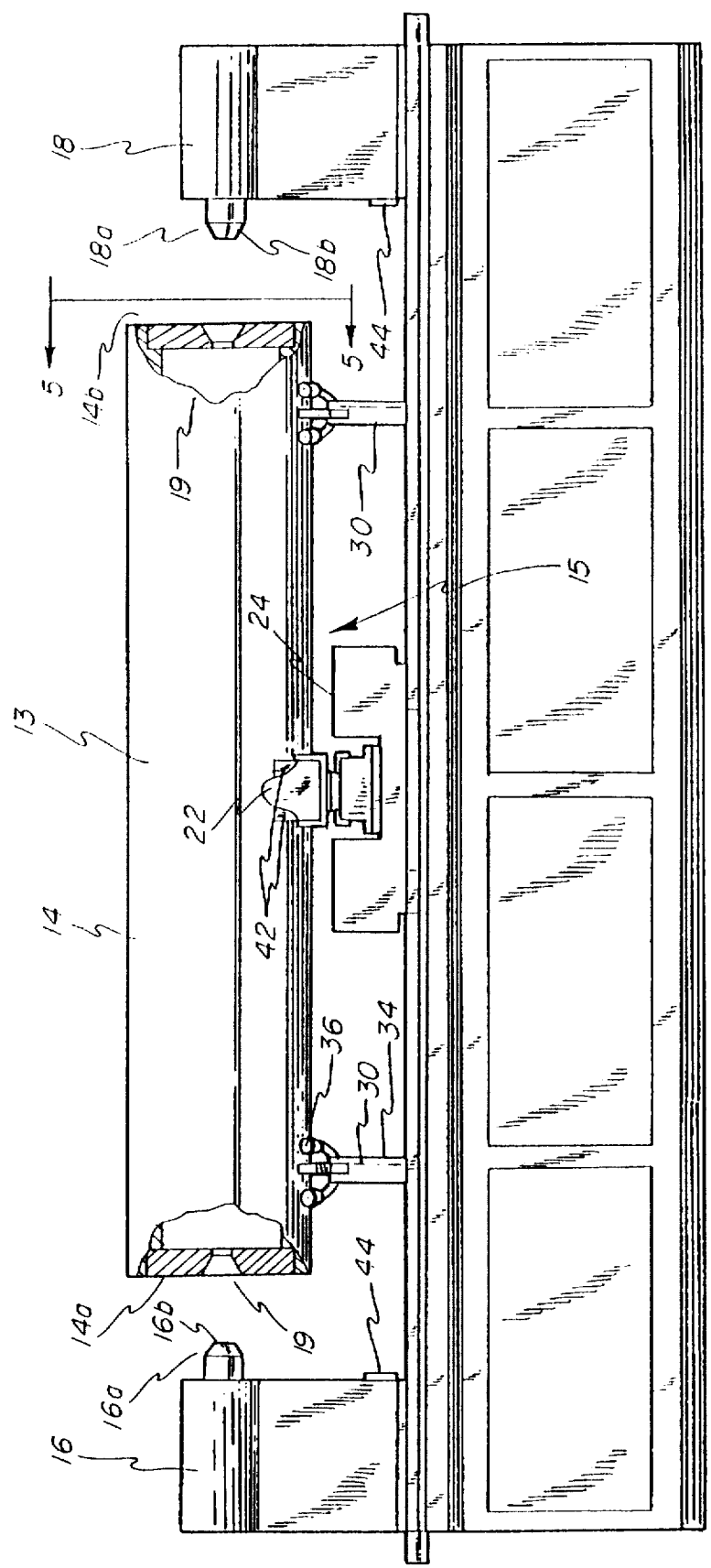
FIG. 3 is another plan view of the engraver showing the cylinder supported by the cylinder supports.

FIG. 1 is a general perspective view of a preferred embodiment of an engraver, designated generally as engraver 10. In the embodiment being described, the engraver 10 is a gravure engraver, but the invention may be suitable for use in any engraver. The engraver 10 may have a surrounding slidable safety cabinet structure which is not shown for ease of illustration. Engraver 10 comprises a base 12 having a headstock 16 and tailstock 18 slidably mounted in tract 20 such that the headstock 16 and tailstock 18 can move towards and away from each other. In this regard, engraver 10 comprises a plurality of linear actuators or first drive motor means or first drive motor 46 and a second drive motor means or second drive motor 48 which are capable of driving the headstock 16 and tailstock 18, respectively, towards and away from each other. For example, the drive motors may cause the headstock 16 and tailstock 18 to be actuated to a fully retracted position, as shown in FIG. 2, or to a cylinder support position shown in FIG. 1. The drive motors may be selectively energized to cause the headstock 154 and tailstock 18 to be actuated either independently or simultaneously. Although not shown, a single drive motor may be used with a single lead screw (not shown) having reverse threads (not shown) on which either end causes the headstock 16 and tailstock 18 to move simultaneously towards and away from each other as the leadscrew is driven. Driving both the headstock 16 and tailstock 18 permits cylinders 14 of varying lengths to be loaded by an overhead crane, for example, whose path is perpendicular to the engravers axis of rotation. However, it should be appreciated that a stationary headstock 16 and tailstock 18 may be used with a driven tailstock 16 or headstock 18, respectively, if, for example, a cylinder loading mechanism (not shown) loads the cylinder 14 by moving it in a direction which is generally parallel to the axis of rotation of the engraver. As best illustrated in FIGS. 2–4, the headstock 16 and tailstock 18 comprise a support shaft 16a and support shaft 18a, respectively. The support shafts 16a and 18a each comprise a conically shaped end 16b and 18b, respectively. The cylinder 14 comprises a first end 14a and second end 14b, each having a receiving opening 19 (FIG. 2) for receiving ends 16b and 18b, respectively. As best illustrated in FIGS. 2–4, the receiving opening 19 is also conically shaped in cross-section so as to matingly receive the ends 16b and 18b.

Although not shown, if a shafted cylinder (not shown) was to be engraved, then the headstock 16 and tailstock 18 would each include a gripping device or chuck (not shown) to rotatably support the cylinder at the engraving station 15.

The engraver 10 also comprises an engraving head 22 having a cutting tool or stylus (not shown) for engraving a surface 13 on the cylinder 14. In the embodiment being described, surface 13 preferably has a copper coating of the type used in gravure engraving. The engraving head 22 is slidably mounted on a carriage 24 such that a third drive means or third drive motor 21 can drive the engraving head 22 towards and away from the cylinder 14 in a direction which is generally radial with respect to the center axis of cylinder 14. The carriage 24 is also slidably mounted on base 12 such that it traverses the entire surface 13 of cylinder 14 in the direction of double arrow 26 in FIG. 1, which is generally parallel to the axis of the cylinder 14. The engraver 10 also comprises a lead screw (not shown) and drive motors (not shown) for causing the carriage 24 to move in the direction of double arrow 26. The engraving head 22, carriage 24 and transverse movement thereof is similar to that shown in Ser. No. 08/038,679, now U.S. Pat. No. 5,438,422; Ser. No. 08/022,127, now issued as U.S. Pat. No. 5,424,845; and Ser. No. 08/023,060, now issued as U.S. Pat. No. 5,329,215, all of which are assigned to the same assignee as the present invention and which is incorporated herein by reference.

The engraver comprises a controller 17 which controls the operation of the engraver 10 and which also controls all the drive motors, such as drive motors 21, 46 and 48. The drive motors 21, 46 and 48 mentioned herein are controlled by a programmable controller 17 which controls the operation of the engraver 10.

The engraver 10 also comprises drive means or a drive motor 28 for rotatably driving the support member 16a, cylinder 14, and support member 18a. The drive motor 28 is operatively coupled to the programmable controller 17.

The engraver 10 further comprises support means or at least one cylinder support 30 for supporting the cylinder 14 between the headstock 16 and tailstock 18, for example, during loading and unloading. The cylinder support 30 comprises a support member 34 having a first end 34a conventionally secured to base 12, for example, by a weld. A second end 34b of support member 34 comprises a support nest 36 which receives and supports cylinder 14. In the embodiment being described, the support member 30 is a telescoping support, with the second end 34b being capable of telescoping towards and away from said first end 34a. In this regard, each cylinder support 30 also comprises drive means or a driver 32 which is coupled to controller 17 and which comprises a gear and screw assembly (not shown) for telescoping or driving the support nest 36 towards and away from the engraving station 15. As best illustrated in FIG. 2, the controller 17 can energize driver 32 to move the cylinder support 30 into the support position shown in FIG. 2, whereupon the support nest 36 is capable of supporting the cylinder 14 at engraving station 15, for example, when the cylinder 14 is being loaded for engraving. As described later herein, the controller 17 subsequently energizes driver 32 to retract the cylinder support 30 and support nest 36 to the retracted position shown in FIG. 4, for example, after the support shafts 16a and 18a of headstock 16 and tailstock 18, respectively, have engaged and support the cylinder 14.

As best shown in FIGS. 5 and 6, the support nest 36 comprises a plurality of support arms 40 which rotatably support a plurality of rollers 38 and 39. The plurality of rollers 38 are mounted in pairs on a roller assembly 45. Each roller assembly 45 is pivotally mounted on an axle 43 (FIG. 5) which is coupled to one of the support arms 40. As best illustrated in FIG. 5, each roller assembly 45 can pivot about the axis of its respective axle 43. The roller assemblies 45 are each self-aligning and pivot to permit the engraver to accommodate a range of cylinder diameters.

The axis of each roller 38 is generally perpendicular to the axis of cylinder 14. This facilitates permitting the cylinder 14 to move laterally in the engraver 10 when the headstock 16 and tailstock 18 grip and release the cylinder 14. The plurality of rollers 38 also facilitate supporting cylinder 14 such that its center axis is generally parallel with the center axis of each of the support shafts 16a and 18a of the headstock 16 and tailstock 18, respectively.

It is to be noted that rollers 39 facilitate guiding and centering cylinder 14 between the headstock 16 and tailstock 18, thereby accommodating lateral misalignment when the cylinder 14 is loaded onto the engraver 10 from above. In the embodiment being described, the plurality of rollers 38 and 39 are made of composite material. It is to be noted that the support nest 36 is capable of supporting cylinders 14 of various weights and having various lengths and diameters.

Although not shown, the engraver 10 may include a plurality of brushes (not shown) positioned in operative relationship with the rollers 38 and 39. The function of the brushes is to clean the rollers and keep their surfaces free of foreign material, such as copper shavings. This facilitates preventing the engraver 10 from making unwanted indentations or scratches in the surface 13 of cylinder 14.

The engraver 10 also comprises sensing means or first sensors 42 which are coupled to controller 17 and which are located on the engraving head 22 (FIG. 1). The sensing means or sensors 42 are capable of sensing, for example, the surface 13 of cylinder 14. The sensors 42 are also capable of sensing the ends 14a and 14b of cylinder 14.

The engraver 10 also comprises second sensing means or sensors 44 coupled to controller 17 and associated with the headstock 16 and tailstock 18 for detecting the proximate location of the carriage 24 relative to the headstock 16 and tailstock 18. In the embodiment being described the first and second sensors 42 and 44 facilitate preventing the carriage 24 from engaging either the headstock 16 or the tailstock 18. A method for loading and unloading the cylinder 14 on the engraver 10 will now be described.

When it is desired to load a cylinder 14 on engraver 10, controller 17 energizes the first and second driver motors 46 and 48 to cause the headstock 16 and tailstock 18, respectively, to move to the loading position shown in FIG. 2. It is to be noted that controller 17 can be programmed with dimensions of the cylinder 14, such as length and diameter. The controller 17 also energizes driver 32 of cylinder support 30 to telescope the support member 34 such that the support nest 36 is operatively positioned at the engraving station 15, as shown in FIG. 2. It is to be noted that controller 17, having been programmed with the length and diameter of cylinder 14, energizes driver 32 to position the support nest 36 such that, when cylinder 14 is supported by the cylinder supports 30, the ends 16b and 18b are generally positioned in operative relationship or alignment with receiving openings 19 on the first end 14a and second end 14b, respectively. After the headstock 16 and tailstock 18 have been actuated to the open position shown in FIG. 2 and the cylinder supports 30 are in the support position, the cylinder 14 is lowered onto the support nest 36. As mentioned earlier herein, the plurality of rollers 39 assist locating and centering the cylinder 14 on the roller assemblies 45 and their respective rollers 38.

Once the cylinder 14 is supported by the support nests 36 of cylinder supports 30, the controller 17 can energize the first and second drivers 46 and 48 to drive the support members 16a and 18a towards ends 14a and 14b, respectively. The headstock 16 and tailstock 18 are driven towards cylinder ends 14a and 14b, respectively, until ends 16b and 18b matingly engage the mating receiving openings 19 in the ends 14a and 14b. Once cylinder 14 is supported between ends 16b and 18b of headstock 16 and tailstock 18, respectively, controller 17 energizes the driver 32 to retract the support nest 36 to the non-support position shown in FIG. 4. It is to be noted that the cylinder 14 is rotatably supported between the headstock 16 and tailstock 18 such that, when controller 17 energizes drive motor 28, the cylinder 14 rotates, for example, in a clockwise direction. The controller 17 subsequently energizes the third drive motor 19 to move the carriage 24 and engraving head 22, respectively, into operative relationship with the surface 13 of the cylinder 14. It is to be noted that the controller 17 may use sensors 42 and 44 to detect the relative position of the cylinder 14 with respect to the engraving head 22. The sensors 42 and 44 are also capable of sensing the ends 14a and 14b in order to facilitate preventing carriage 24 from engaging either the headstock 16 or tailstock 18. The sensors 42 and 44 also permit the controller 17 to position the engraving head 22 in the approximate center of cylinder 14 which, in turn, enables the engraver 10 to accommodate for longitudinal variations in cylinder 14 lengths after the cylinder 14 has been rotatably mounted in the engraver 10. This permits the image (not shown) to be engraved in the surface 13 to be centered on the cylinder 14. The sensors 42 and 44 also enable the engraver 10 to set travel limits to prevent the engraving head 22 from engaging either the headstock 16 or tailstock 18.

After the cylinder 14 is properly located at the engraving station 15, the cylinder ends 14a and 14b are detected by sensors 42 and 44. A test pattern (not shown) is engraved at a position typically defined by the controller 17 or a supervisory computer (not shown). The test pattern is a small pattern of full and partial cells (not shown) characteristic of the cells to be engraved on the cylinder surface 13. The test pattern is typical cut at a location on the surface 13 which will not be used by the image being engraved.

If the test pattern cut is unsatisfactory, then correction are made and another test pattern is cut. This process is repeated until a successful test pattern is cut. If the test pattern is acceptable, In the embodiment being described, controller 17 energizes drive motor 28 to rotatably drive cylinder 14. Controller 17 then causes the carriage 24 to cause the engraving head 22 to traverse the surface 13 of cylinder 14 and simultaneously energizes the cutting stylus (not shown) to oscillate into contact with the cylinder 14, thereby engraving the desired image which comprises a series of control depth cells (not shown) in the surface 13 of cylinder 14. The cylinder 14 rotates in synchronism with the oscillating movement of the stylus (not shown) while the lead screw (not shown) arrangement provides axial movement of the engraving head 22 and carriage 24 such that a precisely controlled engraving path (not shown) is maintained on the surface 13 of print cylinder 14.

After engraving has been completed, controller 17 energizes third drive motor 21 to retract the engraving head 22. Controller 17 also energizes driver 32 to cause the cylinder support 30 to move into the support position shown in FIGS. 1 and 2. Controller 17 then energizes the first and second drive motors 46 and 48 to retract the headstock 16 and tailstock 18, respectively, as shown in FIG. 3. The cylinder 14 may then be removed from the engraving station 15, and another cylinder may then be loaded and engraved in the manner described above.

Advantageously, this invention provides a method and apparatus for automatically loading an engraver 10 with a cylinder 14 to be engraved. The method and apparatus reduce or eliminate the need for an operator during loading and unloading of cylinder 14. The invention may be used to fully automate the engraving process or, alternatively, the invention could be semi-automated, thereby permitting the operator to manually control the operation of the engraver 10. The method and apparatus also provide means for automatically loading and centering cylinder 14 at engraving station 15 such that, for example, when the engraving head 22 is in the home position shown in FIG. 1, the engraving head 22 is positioned generally midway between ends 14a and 14b of cylinder 14.

Various changes or modification in the invention described may occur to those skilled in the art without departing from the true spirit or scope of the invention. For example, although the invention has been shown and described as being pertinent to the gravure engraving environment, it should be appreciated that it could be used in other type of engraving, such as laser engraving of flexo rollers or other processes such as polishing of cylinders 14. Also, the engraver 10 could be provided with one cylinder support 30 or a plurality of cylinder supports 30, if desired. Furthermore, the driver 32 and first, second and third drive motor means 21, 46, and 48 have been described as comprising motors, but they could be any suitable driving apparatus which is capable of performing the same function. Likewise, the cylinder support or support means 30 has been shown and described as comprising the support member 34 and support nest 36, but it could comprise any suitable means which is capable of supporting the cylinder 14 at the engraving station 15 during loading and unloading. The above description of the invention is intended to be illustrative only and not limiting, and it is not intended that the invention be restricted thereto, but that it be limited only by the true spirit and scope of the appended claims.

What is claimed:

1. An engraver support system for use in an engraver having an engraving head which is driven substantially parallel to an axis of a cylinder when the cylinder is engraved, comprising:

a bed;

a headstock and a tailstock slidably mounted on said bed;

at least one driver coupled to said headstock and said tailstock;

a controller coupled to said at least one driver;

said controller energizing said at least one driver in response to at least one input parameter to drive said headstock and said tailstock to rotatably support the cylinder at an engraving station in the engraver.

2. The engraver support system as recited in claim 1 wherein said controller energizes said at least one driver to drive said headstock and tailstock a first distance and a second distance, respectively.

3. The engraver support system as recited in claim 2 wherein said first and second distances are not equal.

4. The engraver support system as recited in claim 2 wherein said first and second distances are substantially the same.

5. The engraver support system as recited in claim 1 wherein said at least one driver comprises a first driver and a second driver, said controller simultaneously energizes said first and second drivers.

6. The engraver support system as recited in claim 1 wherein said at least one driver comprises a first driver and a second driver, said controller energizes said first and second drivers non-simultaneously.

7. The engraver support system as recited in claim 1 further comprising:

an input for inputting a plurality of input parameters into said controller associated with said engraver.

8. The engraver support system as recited in claim 7 wherein said controller is responsive to a plurality of parameters comprising at least one of the following: a cylinder length, a cylinder diameter or a test cut position.

9. The engraver support system as recited in claim 1, further comprising:

at least one sensor coupled to said controller for sensing at least one end of said cylinder.

10. The engraver support system as recited in claim 9 wherein said at least one sensor is an optical sensor.

11. The engraver support system as recited in claim 9 wherein said at least one sensor senses at least one end of the cylinder with a sensor.

12. The engraver support system as recited in claim 9 wherein said at least one sensor is an optical sensor.

13. The engraver support system as recited in claim 9 wherein said at least one sensor senses a position of said cylinder between said headstock and said tailstock.

14. The engraving support system as recited in claim 13 wherein said controller energizes said at least one driver to drive said headstock and said tailstock in response to said position of said cylinder.

15. A cylinder handling system for use in an engraver having a headstock and a tailstock which cooperate to rotatably support a cylinder at an engraving station having an engraving head that moves substantially parallel with an axis of the cylinder during engraving in said engraver, comprising:

a cylinder support for aligning the cylinder between said headstock and said tailstock; and a driver coupled to said cylinder support for driving said cylinder support towards and away from said engraving station.

16. The cylinder handling system of claim 15 wherein said engraver comprises a carriage having the engraving head mounted thereon; said cylinder handling system further comprising:

at least one sensor associated with said carriage for sensing a position of said cylinder when said cylinder is located at said engraving station.

17. The cylinder handling system of claim 16 wherein said cylinder comprises a first end and a second end, wherein said at least one sensor senses a relative position between said cylinder and said engraving head.

18. The cylinder handling system of claim 15 wherein said cylinder support further comprises a support nest.

19. The cylinder handling system of claim 18 wherein said support nest comprises a plurality of rollers for supporting said cylinder between said headstock and said tailstock.

20. The cylinder handling system of claim 18 wherein said driver comprises a motor and said support nest comprises a plurality of rollers for supporting said cylinder between said headstock and said tailstock.

21. The cylinder handling system of claim 15 wherein said cylinder support engages a surface of said cylinder when said cylinder support supports said cylinder between said headstock and said tailstock.

22. An engraver comprising:

a base;

a headstock and a tailstock, said headstock and said tailstock rotatably supporting a cylinder therebetween;

a carriage slidably mounted on said base to move in a direction which is parallel to said axis of said cylinder when said cylinder is being engraved;

an engraving head mounted on said carriage for movement towards and away from said engraving station;

a driver for rotatably driving said cylinder when said cylinder is mounted between said headstock and said tailstock; and at least one support for aligning the cylinder between said headstock and said tailstock.

23. The engraver of claim 22 wherein said cylinder comprises a first end and a second end, said engraver further comprising;

a first drive motor coupled to said headstock;

a second drive motor driver coupled to said tailstock;

said first drive motor and said second drive motor being selectively energized to cause said headstock and said tailstock to move towards and away from each other such that said cylinder becomes rotatably mounted between said headstock and said tailstock.

24. The engraver of claim 23 wherein said engraver comprises a third drive motor coupled to said engraving head for causing said engraving head to move towards and away from said engraving station.

25. The engraver of claim 22 wherein said engraver comprises:

a drive motor coupled to both said headstock and said tailstock;

said drive motor being coupled to said headstock and said tailstock such that said headstock and said tailstock move towards and away from each other when said drive motor is energized.

26. The engraver of claim 22 wherein said engraver comprises:

a drive motor coupled to either said headstock or said tailstock;

said drive motor being coupled to either said headstock or said tailstock such that said headstock or said tailstock moves towards and away from said tailstock and said headstock, respectively, when said drive motor is energized.

27. The engraver of claim 22 wherein said headstock and said tailstock each comprise a support member for engaging said first end and said second end, respectively, of said cylinder and also for rotatably supporting said cylinder at said engraving station.

28. The engraver of claim 27 wherein said first end and said second end of said cylinder each comprise a receiving opening which is arcuately shaped in cross-section;

each of said support members of said headstock and tailstock being arcuately shaped so as to be received in mating engagement in said receiving opening of said first end and said second end, respectively.

29. The engraver of claim 27 wherein said first end comprises a first shaft and said second end comprises a second shaft;

each of said headstock and said tailstock comprising a gripping device for gripping said first and second shafts and for rotatably supporting said cylinder.

30. The engraver of claim 22 wherein said engraving head is a an electromechanical engraving head.

31. The engraver of claim 22 wherein said engraver comprises a carriage having an engraving head slidably mounted thereon; said engraver further comprising:

sensing means associated with said carriage for sensing a position of said cylinder when said cylinder is located at said engraving station.

32. The engraver of claim 31 wherein said sensing means comprises a sensor for sensing a relative position between said cylinder and said engraving head.

33. The engraver of claim 22 wherein said at least one support comprises a support nest.

34. The engraver of claim 33 wherein said support nest comprises a plurality of rollers for supporting said cylinder between said headstock and tailstock.

35. The engraver of claim 34 wherein said plurality of rollers are positioned in a U-shape.

* * * * *

UNITED STATES PATENT AND TRADEMARK OFFICE
CERTIFICATE OF CORRECTION

PATENT NO. : 5,751,435
DATED : May 12, 1998
INVENTOR(S) : Bornhorst, Jr. et al.

It is certified that error appears in the above-identified patent and that said Letters Patent is hereby corrected as shown below:

Please cancel claim 10

Claim 11, column 8, line 11, after "cylinder", please delete "with a sensor".

Please cancel claim 12

Claim 22, column 9, line 2, delete "said" and insert --an-- therefor.

Claim 27, column 10, line 3, please delete "said first end and said second end" and insert --a first end and a second end-- therefor.

Signed and Sealed this

Second Day of March, 1999

Attest:

Q. TODD DICKINSON

*Attesting Officer*   *Acting Commissioner of Patents and Trademarks*